United States Patent [19]

Schaber

[11] 4,255,808

[45] Mar. 10, 1981

[54] HARD OR SOFT CELL FAILURE DIFFERENTIATOR

[75] Inventor: Scott D. Schaber, St. Paul, Minn.

[73] Assignee: Sperry Corporation, New York, N.Y.

[21] Appl. No.: 31,574

[22] Filed: Apr. 19, 1979

[51] Int. Cl.³ .................... G06F 11/08; G11C 29/00
[52] U.S. Cl. .................................................. 371/38
[58] Field of Search .......................... 235/312, 302.3;
364/900 MS File, 900; 371/38

[56] References Cited

U.S. PATENT DOCUMENTS

| | | | |
|---|---|---|---|
| 3,906,200 | 9/1975 | Petschauer | 235/312 |
| 3,917,933 | 11/1975 | Scheuneman | 235/312 |
| 3,999,051 | 12/1976 | Petschauer | 235/312 |
| 4,045,779 | 8/1977 | Markle | 364/900 |
| 4,112,502 | 9/1978 | Scheuneman | 364/900 |

*Primary Examiner*—David H. Malzahn
*Attorney, Agent, or Firm*—Kenneth T. Grace; William E. Cleaver; Marshall M. Truex

[57] ABSTRACT

A method of and an apparatus for differentiating between hard and soft failures of semiconductor memory cells for the purpose of error logging only hard failures. A spare bit position is appended to each addressable location within the semiconductor memory. The spare bit position is set, if the corresponding addressable location is observed to contain a single bit error during regeneration. The spare bit position is cleared, if the corresponding addressable location is observed not to contain a single bit error during regeneration. An error log entry is made for normal read access to an addressable location observed to contain a single bit error only if the spare bit is set indicating that a single bit error was present during regeneration of that addressable location.

7 Claims, 6 Drawing Figures

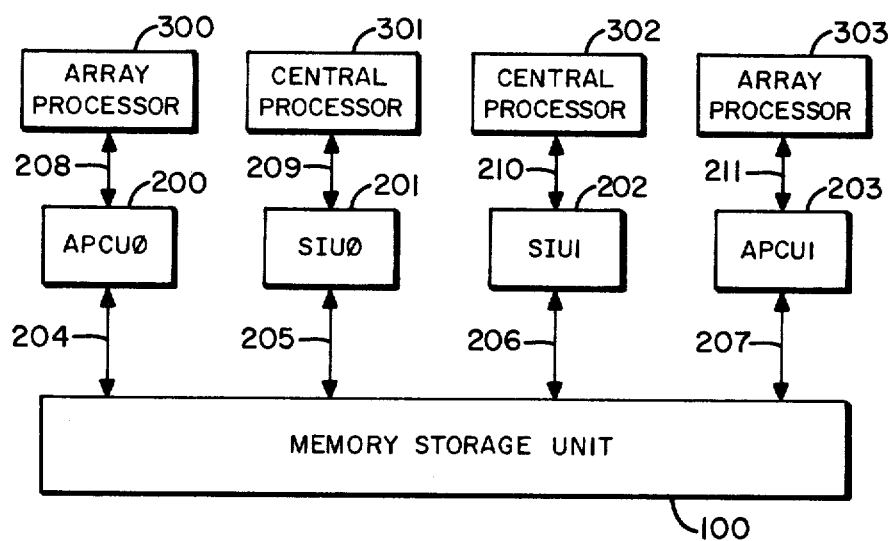
_Fig. 1a_
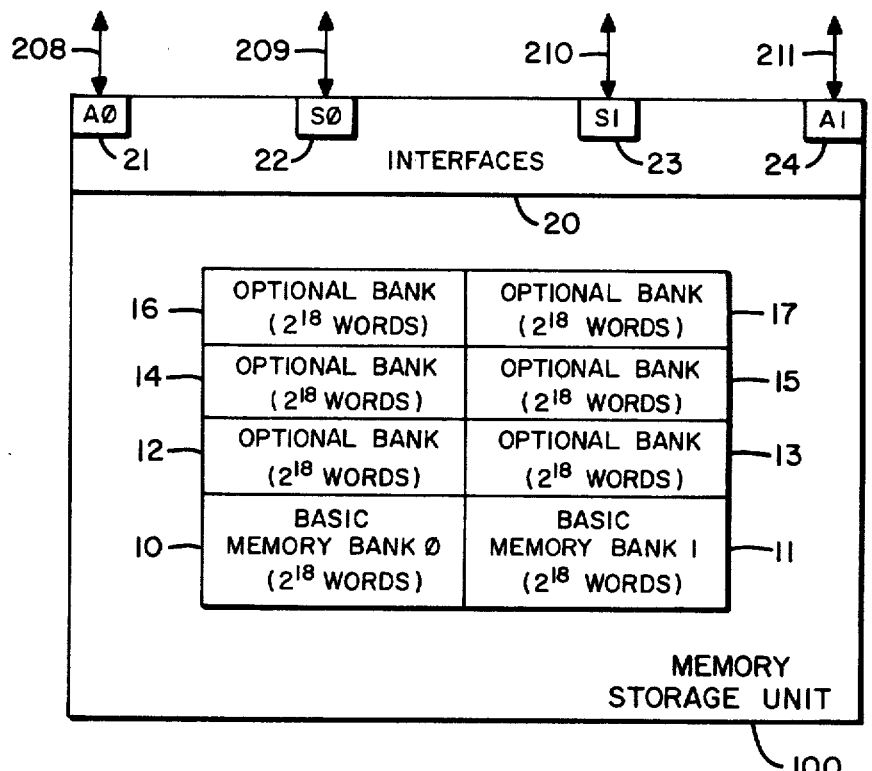
_Fig. 1b_

HARD OR SOFT CELL FAILURE DIFFERENTIATOR

BACKGROUND OF THE INVENTION

The present invention relates generally to memory error control techniques and more specifically to a technique for improving the logging of memory errors. Semiconductor storage units made by large scale integrated circuit techniques have proven to be cost-effective for certain applications of storing digital information. Most storage units are comprised of a plurality of similar storage devices or bit planes each of which is organized to contain as many storage cells or bits as feasible in order to reduce per bit costs and to also contain addressing and read and write circuits in order to minimize the number of connections to each storage device. In many designs, this has resulted in an optimum storage device or bit plane that is organized as M words of 1 bit each where M is some power of two, typically 256, 1024 or 4096. Certain contemporary technologies produce devices of $2^{14}$ or more bits. Because of the 1 bit organization of the storage device, single bit error correction as described by Hamming in the publication "Error Detecting and Correcting Codes", R. W. Hamming, The Bell System Journal, Volume XXIX, April, 1950, No. 2, pp. 147-160, has proven quite effective in correcting the error of a single storage cell or bit in a given word, i.e., a single bit error, the word being of a size equal to the word capacity of the storage unit, without causing loss of data readout from the storage unit. This increases the effective mean-time-between-failure (MTBF) of the storage unit.

Theses errors may be classified either as short-lived or long-lived and are designated "soft" (intermittent) or "hard" (permanent, solid), respectively. A soft error may, for example, be the result of a sudden fluctuation in the power supply or the result of a momentary presence of electric or magnetic noise in or near the system. It is currently known that residual alpha particle activity does produce soft errors. A hard error may, for example, result from the breakdown of a component such as a transistor or diode. A hard or solid error is normally the symptom of a component failure, whereas a soft error by its nature may be the result of indeterminate and unrepeatable causes. For their purposes, maintenance personnel must respond to a hard failure with corrective action but are likely powerless to act upon soft errors.

Because the storage devices are quite complex, and because many are used in a semiconductor memory storage unit, they usually represent the predominant component failure in a storage unit. Consequently, it is common practice to employ some form of single it error correction along the lines described in Hamming. While single bit error correction allows for tolerance of storage cell failures, as more of them fail, the statistical chance of finding two of them, i.e., a double bit error, in the same word increases. Since two failing storage cells in the same word cannot be corrected, it would be desirable to replace all defective storage devices before this occurred, such as at a time when the storage unit would not be in use but assigned to routine preventative maintenance.

While it would be possible to replace each defective storage device shortly after it failed, this normally would not be necessary. It would be more economical to defer replacement until several storage devices were defective thereby achieving a better balance between repair costs and the probability of getting a double failure in a given word. One technique for doing this is to use the central processor to which the storage unit is connected to do this as one of its many other tasks under its normal logic and program control. However, this use of processor time effectively slows down the processor for its intended purpose since time must be allocated to log errors from the storage unit. The effect of this can be better understood when it is noted that a complete failure of a storage device in an often-used section of the storage unit may require a single error to be reported every storage cycle. Since the processor may need several storage cycles to log the error, a great loss of performance would result. One method which has been used to alleviate this is to sample only part of the errors, but this causes lack of logging completeness.

The present art uses a technique referred to as "error logging" disclosed by Petschauer in U.S. Pat. No. 3,999,051. The problem with the Petschauer approach is its inability to distinguish between soft and hard errors, thereby notifying operators of and scheduling maintenance periods partially as a function of soft errors which are of little immediate operational concern.

Seppa in U.S. patent application Ser. No. 856,706 assigned to the assignee of the present invention, teaches a scheme for error logging which counts successive single bit errors within the error log and notifies the central processor via interrupt of counts which exceed a given threshold. The Seppa technique requires the error log to contain storage for the single bit error count as well as the single bit error syndrome which identifies the bit position observed to be in error. Additional hardware is also required by Seppa for comparing the stored single bit error syndrome with the current single bit error syndrome.

The present invention is intended to achieve a result similar to Seppa (i.e., differentiation between soft and hard errors) without the additional complexity in the error logging hardware.

However, the present invention assumes a memory storage unit which employs regeneration which periodically reads from, corrects single bit errors, and rewrites into each addressable location to prevent degradation of the data base.

SUMMARY OF THE INVENTION

A spare bit position is appended to each addressable location within the memory storage unit. The spare bit position may be written into only during regeneration. That means that the spare bit position is not modified during a normal write access. During regeneration, any read from an addressable location observed to contain a single bit error causes a binary one to be written into the spare bit position of that addressable location. During regeneration, any read from an addressable location not observed to contain a single bit error causes a binary zero to be written into the spare bit position of that addressable location.

Normal read accesses (i.e., initiated by a requestor and not by regeneration) to an addressable location cause the spare bit position to also be read. The binary value of the spare bit position is anded with a signal indicating that single bit error was observed during the instant normal read access. If the spare bit position contains a binary one and a single bit error was observed in the instant normal read access, a hard error is declared to the error logging circuitry. If the spare bit position contains a binary zero, a single bit error observed in the instant normal read access is assumed to be a soft error and the error logging circuitry is not notified.

BRIEF DESCRIPTION OF THE DRAWINGS

FIG. 1a shows the overall configuration of a memory storage unit with its interfaces to two array processors and two central processors.

FIG. 1b shows the configuration options of the Memory Storage Unit.

DETAILED DESCRIPTION OF THE PREFERRED EMBODIMENT

Figure 1C:
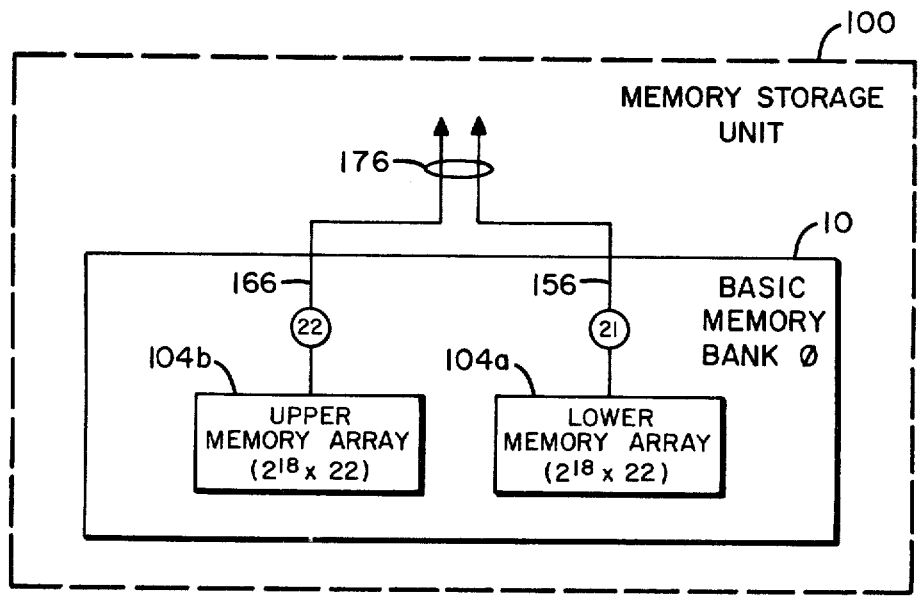
FIG. 1c shows the organization of one Basic Memory Bank.

The preferred embodiment of the present invention is described as incorporated in the Sperry Univac ® Type 7050-00 memory storage unit, though application to Sperry Univac Type 7037 and Type 7047 memory storage units is also contemplated. Each of these storage units has a spare bit position at each addressable location for packaging reasons making incorporation of the present invention particularly attractive. However, the present invention may be readily used, as described herein, with other memory types by the addition of a spare bit position as required.

The Sperry Univac Type 7050-00 memory storage unit uses large scale integrated (LSI) circuit semiconductor memory elements of the NMOS family providing a state of the art, volatile mainframe memory. The memory storage unit, has single bit error correction using the technique taught by Hamming (see above).

The Type 7050-00 memory storage unit employs a refresh cycle of duration 600 nanoseconds with a period of 24 microseconds. The Type 7050-00 memory storage unit, along with the Type 7037 and Type 7047 memory storage units also employs a regenerate cycle. The regenerate cycle is a read/correct data (using the single bit error correction circuitry)/rewrite operation which occurs after N refresh cycles wherein N is 256 for the Type 7050-00 memory storage unit. The purpose of regeneration, of course, is to periodically correct the data effected by soft errors before they become uncorrectable through accumulation (i.e., before two or more soft errors occur at the same addressable location precluding correction by the single bit error correction circuitry).

FIG. 1a shows MEMORY STORAGE UNIT 100 (e.g., Type 7050-00) in its normal configuration. MEMORY STORAGE UNIT 100 has four access ports through which the control and data signals are transferred to enable one requestor at each access port to read from and write into specific addressable locations of MEMORY STORAGE UNIT 100. Two of the four access ports are connected via lines 204 and 207 to Array Processor Control Unit 0, APCU$\phi$ 200, and APCU1 203, respectively. The remaining two access ports are connected to storage interface units SIU$\phi$ and SIU1 202, via line 205 and line 206, respectively. APCU$\phi$ 200 is a device to interface between MEMORY STORAGE UNIT 100 and ARRAY PROCESSOR 300. APCU$\phi$ 200 contains a buffer or cache memory and control and formatting logic to optimize the interface between MEMORY STORAGE UNIT 100 and ARRAY PROCESSOR 300. APCU1 203 provides a similar function for ARRAY PROCESSOR 303.

Similarly SIU$\phi$ 201 and SIU1 202 optimize the interface between MEMORY STORAGE UNIT 100, and CENTRAL PROCESSOR 301 and CENTRAL PROCESSOR 302, respectively. SIU$\phi$ 201 and SIU1 202 also contain formatting logic and cache memories. In the preferred embodiment, SIU$\phi$ 201 and SIU1 202 are Sperry Univac Type 7039 Storage Interface Units. Similarly, APCU$\phi$ 200 and APCU1 203 are standard Sperry Univac devices. The Storage Interface Units and the Array Processor Control Units are somewhat different in internal construction. However, for the purpose of the present invention, they appear as equivalent units having the same function.

FIG. 1b shows the configurations of MEMORY STORAGE UNIT 100. The minimum configuration of MEMORY STORAGE UNIT 100 contains BASIC MEMORY BANK$\phi$ 10 and BASIC MEMORY BANK1 11 providing $2^{19}$ words of storage or addressable locations. Optional Banks 12–17 may be added as required wherein each Optional Bank provides an additional $2^{18}$ addressable locations. Therefore, the maximum configuration of MEMORY STORAGE UNIT 100 contains $2^{21}$ addressable locations. Each addressable location contains 36 data bit positions, along with seven error coding bit positions and a spare bit position as shown in FIG. 1d. The four interfaces are shown in FIG. 1b as A$\phi$ 21, S$\phi$ 22, S1 23, and A1 24.

Figure 1D:
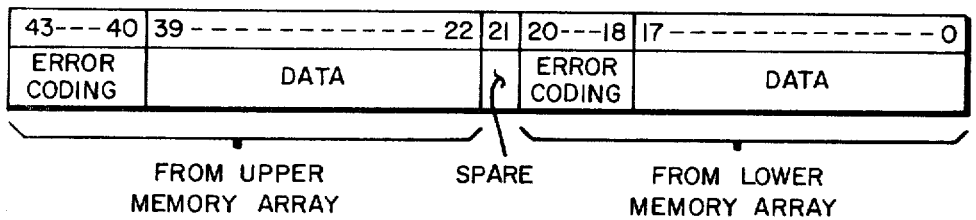
FIG. 1d shows the prior art data format of the read output of one Basic Memory Bank.

FIG. 1c shows the functional composition of BASIC MEMORY BANK$\phi$ 10. Notice that it contains two memory arrays, UPPER MEMORY ARRAY 104b and LOWER MEMORY ARRAY 104a. Each memory array contains $2^{18}$ addressable locations of 22 bit positions. UPPER MEMORY ARRAY 104b and LOWER MEMORY ARRAY 104a are identical internally. However, only 43 bit positions are needed for each addressable location (i.e., 36 data bit positions and seven error coding bit positions as indicated by Hamming). Therefore, only 21 bit positions of LOWER MEMORY ARRAY 104a are combined with the 22 bit positions of UPPER MEMORY ARRAY 104b to form the required 43 bit word. BASIC MEMORY BANK1 11 and Optional Banks 12–17 are similarly constructed.

FIG. 1d shows the composition of the 43 bit word obtained by referencing any addressable location of any Basic or Optional Memory Bank. Notice that bit position $2^{21}$ is a spare bit position and not used in the prior art MEMORY STORAGE UNIT.

Figure 2:
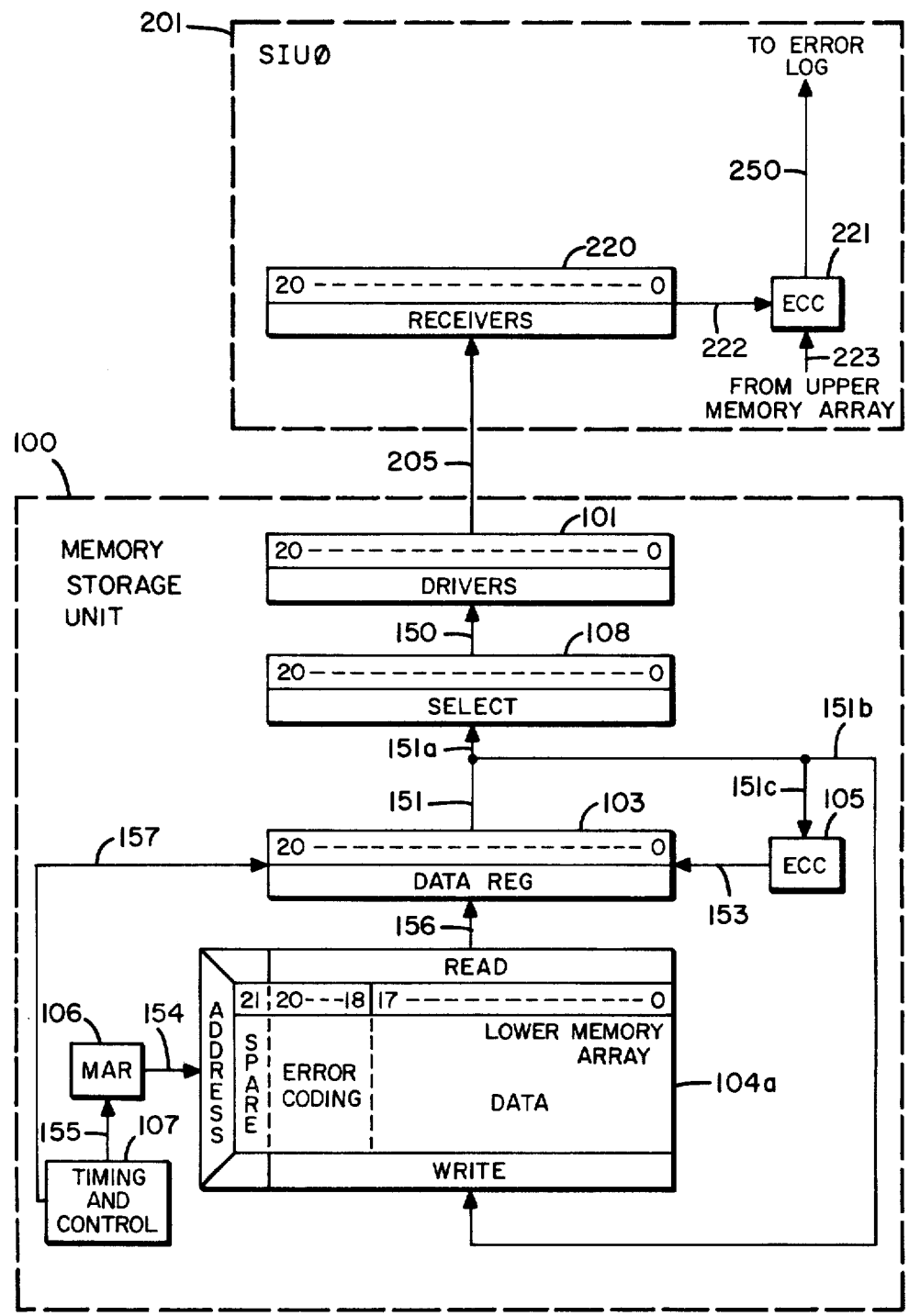
FIG. 2 shows the relevant elements of the prior art memory storage unit and array processor control unit circuitry.

FIG. 2 shows how LOWER MEMORY ARRAY 104a of BASIC MEMORY BANK$\phi$ 10 of MEMORY STORAGE UNIT 100 is interfaced to SIU$\phi$ 201 in the prior art system. The interface is presented in this manner for clarity although the reader is reminded that line 205 actually transfers the 22 bit positions of UPPER MEMORY ARRAY 104b along with the 21 bit positions of LOWER MEMORY ARRAY 104a. FIG. 1d shows the format of the data transferred via line 205 as explained above. Also, omitted from FIG. 2 to clarify the description are BASIC MEMORY BANK1 11 and Optional Memory Banks 12–17 of MEMORY STORAGE UNIT 100 which are interfaced to SIU$\phi$ 201 in a similar fashion. The interfaces between MEMORY STORAGE UNIT 100 and APCU$\phi$ 200, SIU1 202, and APCU1 203 are implemented in a similar fashion.

LOWER MEMORY ARRAY 104a has a 21 bit write interface via line 151b, a 21 bit read interface via line 156 and an 18 bit address interface via line 154. During a normal write access, an 18 bit address is supplied by Memory Address Register, MAR 106, via line 154 to select the desired one of the $2^{18}$ addressable locations of LOWER MEMORY ARRAY 104a. The 21 bits of line 151b are coupled to LOWER MEMORY ARRAY 104a and the one addressable location addressed by MAR 106 is loaded.

During a normal read access, LOWER MEMORY ARRAY 104a is addressed in a similar fashion. The 21 bit positions (i.e., the 21 used bit positions of the 22 bit positions of LOWER MEMORY ARRAY 104a) of the addressed location of LOWER MEMORY ARRAY 104a are transferred to the Data register, DATA REG 103, via line 156. The 21 bit contents of DATA REG 103 are transferred to the output selector, SELECT 108, which uses circuitry not shown to select data from the addressed one of the eight possible (i.e., two Basic and six Optional) Memory Banks of MEMORY STORAGE UNIT 100. The 21 bit output of SELECT 108 is transferred to the interface drivers, DRIVES 101, via line 150. DRIVERS 101 transfer the 21 bit positions via line 205 to SIU$\phi$ 201. The interface receivers, RECEIVERS 220, transfer the 21 bit positions received via line 205 through circuitry not shown to the cache memory also not shown. Of significance to the present invention is that RECEIVERS 220 also transfer the 21 bit positions to the error correction circuitry, ECC 221 via line 222. ECC 221 performs single bit error correction can double bit error detection on the entire 43 bit word represented by the 21 bit positions received via line 222 and the 22 bit positions received from UPPER MEMORY ARRAY 104 via line 223. ECC 221 receives 43 of the 44 bit positions shown in FIG. 1d (i.e., except the spare bit position $2^{21}$) as explained above. Referring again to FIG. 2, ECC 221 notifies the Error Log circuitry via line 250 of any single bit error detected during the normal read access.

The regenerate cycle is entirely performed within MEMORY STORAGE UNIT 100. TIMING AND CONTROL 107 sequentially provides MAR 106 with each of the $2^{18}$ addresses corresponding to each of the $2^{18}$ addressable locations of LOWER MEMORY ARRAY 104a. A complete read/correct data/rewrite operation is performed for each of the $2^{18}$ addresses supplied by TIMING AND CONTROL 107. As explained above, the regenerate cycle occurs after N (N=256 for Type 7050) refresh cycles and consists of a complete read/correct data/rewrite operation at each of the $2^{18}$ addressable locations of LOWER MEMORY ARRAY 104a.

For each address provided to MAR 106 by TIMING AND CONTROL 107 during the regenerate cycle, the contents (i.e., bit positions $2^0-2^{20}$) of the corresponding addressable location of LOWER MEMORY ARRAY 104a are read and transferred to DATA REG 103 via line 156. DATA REG 103 transfers the 21 bit positions to Error Correction Circuitry, ECC 105, via line 151 and line 151c. ECC 105 functions very much like ECC 221 providing single bit error correction of the contents of DATA REG 103 via line 153. The potentially corrected contents of DATA REG 103 are then supplied via line 151 and line 151b to LOWER MEMORY ARRAY 104a to be rewritten into the one of $2^{18}$ addressable locations specified by the address in MAR 106. The regenerate cycle continues a TIMING AND CONTROL 107 provides the next sequential address to MAR 106 permitting the read/correct data/rewrite operation to be performed at every one of the $2^{18}$ addressable locations of LOWER MEMORY ARRAY 104a.

Figure 3:
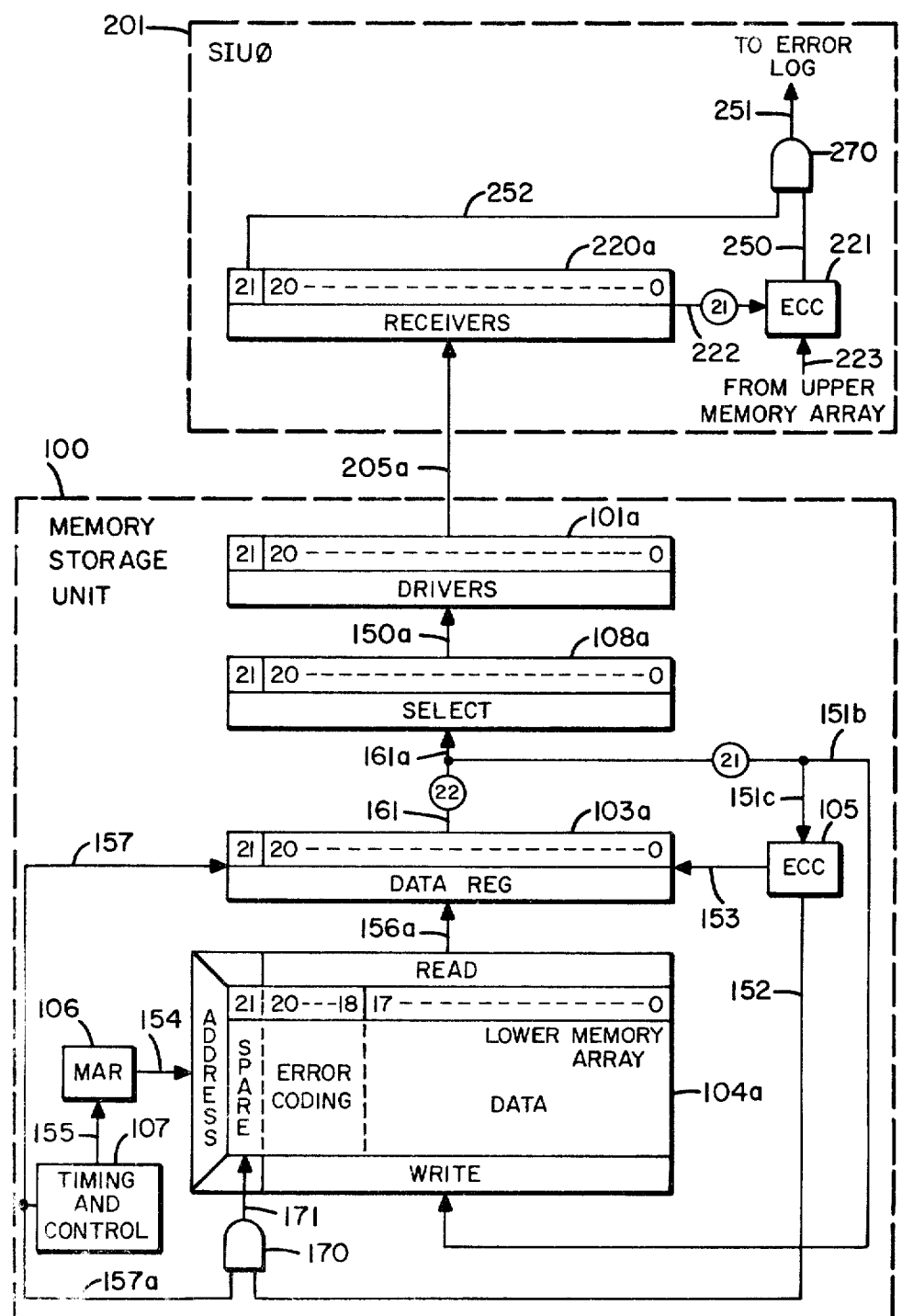
FIG. 3 shows the same circuitry as FIG. 2 modified to incorporate the present invention.

FIG. 3 shows the incorporation of the present invention. MAR 106, TIMING AND CONTROL 107, ECC 105, and ECC 221 are exactly as in the prior art. LOWER MEMORY ARRAY 104a is exactly as in the prior art except that the spare bit position (i.e., bit position $2^{21}$) has a write input via line 171 and has a read output via line 156a. DATA REG 103a, SELECT 108a, DRIVERS 101a, and RECEIVERS 220a are the same as their prior art components except that each has been expanded from 21 to 22 bit positions. Lines 222, 223, 151b, 151c, 153, 157, 155, and 154 remain the same as in the prior art. Lines 205a, 150a, 161, 161a, and 156a are identical to the prior art counterparts except that they have been expanded from 21 to 22 bit positions. AND gates 170 and 270 and lines 252, 251, 152, 157a, and 171 have been added as new components.

According to the present invention, the regenerate cycle proceeds as described above, except that the spare bit position (i.e., bit position $2^{21}$ is written into during the rewrite portion of each read/correct data/rewrite operation. Bit position $2^{21}$ has a binary one written during rewrite if line 171 is at a state of high. Bit position $2^{21}$ has a binary zero written during rewrite if line 171 is at a state of low. The state of line 171 is determined by AND gate 170. AND gate 170 forces line 171 to a state of high if both line 157a and line 152 are at a state of high. Line 152 is a state of high if ECC 105 observes a single bit error during the correct data portion of a read/correct data/rewrite operation of the regenerate cycle. Line 157a is forced to a state of high by TIMING AND CONTROL 107 only during the rewrite portion.

During a normal read access to LOWER MEMORY ARRAY 104a, all 22 bit position of the addressable location addressed by MAR 106 are transferred to RECEIVERS 220a via DATA REG 103a, SELECT 108a, and and DRIVERS 101a and lines 156a, 161, 161a, 150a, and 205a all of which having been modified to transfer the spare (i.e., $2^{21}$) bit position. RECEIVERS 220a continue to handle bit positions $2^0-2^{20}$ as described above. Bit position $2^{21}$ is transferred only to AND gate 270 via line 252. AND gate 270 forces line 251 to a state of high notifying the Error Log circuitry only if ECC 221 indicates (by forcing line 250 to a state of high) that a single bit error has been observed in the data received via line 222 from RECEIVERS 220a and line 252 is at a state of high indicating that bit position $2^{21}$ had been set to a binary one at the observance of a single bit error at that addressable location during the most recent regenerate cycle.

The present invention was described as embodied in a current Memory Storage Unit (i.e., Type 7050) having a specific configuration with a spare bit position. Those skilled in the art, however, will readily see the application of the present invention to Memory Storage Units having different configurations.

What is claimed is:

1. In a data processing system with a memory storage unit having a memory bank containing a plurality of addressable locations from which data may be read and having a first error detecting and correcting means responsively coupled to said memory bank for detecting errors in said data read from said memory bank and correcting said data for rewrite into said memory bank and having regeneration means responsively coupled to said memory bank and said first error detecting and correcting means for reading said data from said memory bank, for permitting said first error detecting and correcting means to correct said data, and for rewriting said corrected data into said memory bank and with a second error detection and correcting means responsively coupled to said memory storage unit for detecting and correcting errors in data read from said memory storage unit and with an error logging store responsively coupled to said second error detecting and correcting means which maintains a history of errors detected and corrected by said second error detecting and correcting means, the improvement comprising:

a plurality of storage elements wherein a different one of said plurality of storage elements corresponds to each of said plurality of addressable locations contained within said memory bank wherein said different one of said plurality of storage elements is read whenever said memory bank is read at a corresponding one of said plurality of addressable locations;

means responsively coupled to said regeneration means, said first error detecting and correcting means, and said plurality of storage elements for setting to first predetermined value said different one of said plurality of storage elements corresponding to one of said plurality of addressable locations of said memory bank whenever said regeneration means reads from said memory bank at said corresponding one of said plurality of addressable locations and said first error detecting and correcting means detects an error in data read from said memory bank at said corresponding one of said plurality of addressable locations; and means responsively coupled to said error logging store, said plurality of storage elements, and said second error detecting and correcting means for inhibiting said error logging store from recording an error detected by said second error detecting and correcting means for which said different one of said plurality of storage elements corresponding to a one of said plurality of addressable locations is not set to said first predetermined value.

2. A data processing system according to claim 1 wherein said memory bank further comprises:
a semiconductor memory bank.

3. A data processing system according to claim 2 wherein said second error detecting and correcting means further comprises:
a single bit error correction double bit error detection circuit.

4. A data processing system according to claim 3 wherein said error logging store maintains a history of single bit errors.

5. A data processing system according to claim 1 or claim 2 or claim 3 or claim 4 wherein said memory storage unit further comprises:
means responsively coupled to said regeneration means, said first error detecting and correcting means, and said plurality of storage elements for clearing to a second predetermined value said different one of said plurality of storage elements corresponding to one of said plurality of addressable locations whenever said regeneration means reads from said memory bank at said corresponding one of said plurality of addressable locations and said first error detecting and correcting means detects no error in data read from said memory bank at said corresponding one of said plurality of addressable locations.

6. In a semiconductor memory storage unit having a memory bank which may be accessed at a plurality of addressable locations wherein data may be read from and written into said memory bank at each of said plurality of addressable locations and having a first single bit error correction circuit responsively coupled to said memory bank for detecting and correcting single bit errors in data read from said memory bank before said data is rewritten into said memory bank and having regeneration means responsively coupled to said memory bank and said first single bit error correction circuit for reading from and writing into said memory bank wherein data read from said memory bank at a one of said plurality of addressable locations has any single bit errors detected and corrected by said first single bit error correction circuit before being rewritten into said memory bank, and having a second single bit error correction circuit responsively coupled to said memory bank, and having an error logging store responsively coupled to said second single bit error correction circuit for recording that said second single bit error correction circuit had detected a single bit error in data read from said memory bank at a one of said plurality of addressable locations, the improvement compromising:

a different spare bit storage element corresponding to each of said plurality of addressable locations of said memory bank;

means responsively coupled to said different spare bit storage element, said regeneration means, and said first single bit error correction circuit for setting said different spare bit storage element whenever said regeneration means had read data from said memory bank at a one of said plurality of addressable locations corresponding to said different spare bit storage element and said first single bit error correction circuit had detected a single bit error in said data read from said memory bank at one of said plurality of addressable locations by said regeneration means; and means responsively coupled to said different spare bit storage element, said second single bit error correction circuit, and said error logging store for inhibiting said error logging store from recording that said second single bit error correction circuit had detected a single bit error in data read from said memory bank at one of said plurality of addressable locations if said different spare bit storage element corresponding to said one of said plurality of addressable locations is not set.

7. A memory storage unit according to claim 6 further comprising:
means responsively coupled to said regeneration means, said first single bit error correction circuit and said different spare bit storage element for clearing said different spare bit storage element corresponding to a one of said plurality of addressable locations of said memory bank wherein data had been read from said one of said plurality of addressable locations by said regeneration means and said first single bit error correction circuit had not detected a single bit error.

* * * * *